(12) United States Patent
Yang et al.

(10) Patent No.: US 11,991,030 B2
(45) Date of Patent: *May 21, 2024

(54) TECHNIQUES FOR GENERATING SIGNAL SEQUENCES FOR WIRELESS COMMUNICATIONS

(71) Applicant: QUALCOMM Incorporated, San Diego, CA (US)

(72) Inventors: Wei Yang, San Diego, CA (US); Seyong Park, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,910

(22) Filed: Apr. 27, 2022

(65) Prior Publication Data
US 2022/0255783 A1    Aug. 11, 2022

Related U.S. Application Data

(63) Continuation of application No. 16/709,621, filed on Dec. 10, 2019, now Pat. No. 11,329,851.

(51) Int. Cl.
*H04L 27/26* (2006.01)
(52) U.S. Cl.
CPC ...... *H04L 27/2613* (2013.01); *H04L 27/2607* (2013.01); *H04L 27/2614* (2013.01)

(58) Field of Classification Search
CPC ............ H04L 27/2613; H04L 27/2614; H04L 27/261; H04L 27/2634; H04L 27/2607; H04J 13/0062
See application file for complete search history.

(56) References Cited

U.S. PATENT DOCUMENTS

| | | | |
|---|---|---|---|
| 11,329,851 | B2 * | 5/2022 | Yang ................ H04L 27/2607 |
| 2008/0232486 | A1 | 9/2008 | Kowalski |
| 2010/0285755 | A1 | 11/2010 | Iwai et al. |
| 2018/0241603 | A1 | 8/2018 | Jia et al. |
| 2019/0273590 | A1 | 9/2019 | Becker |
| 2020/0145266 | A1 | 5/2020 | Yang et al. |
| 2021/0176104 | A1 | 6/2021 | Yang et al. |

FOREIGN PATENT DOCUMENTS

| CN | 103765802 A | 4/2014 |
|---|---|---|
| CN | 107040489 A | 8/2017 |

OTHER PUBLICATIONS

International Search Report and Written Opinion—PCT/US2020/063170—ISA/EPO—dated Feb. 24, 2021.
(Continued)

*Primary Examiner* — Betsy Deppe
(74) *Attorney, Agent, or Firm* — Arent Fox, LLP

(57) ABSTRACT

Some aspects described herein relate to generating, based on a sequence length for communicating a signal, a reduced length sequence to be of a reduced length that is a largest prime number smaller than a fraction of the sequence length, extending the reduced length sequence to be of the sequence length to generate a sequence for communicating the signal, and transmitting or receiving the signal based on the sequence.

30 Claims, 6 Drawing Sheets

(56) References Cited

OTHER PUBLICATIONS

Nokia, et al., "UL DMRS Base Sequences With IFDMA", 3GPP Draft, R1-167087, 3GPP TSG RAN WG1 Meeting #86, UL DMRS Base Sequences With IFDMA Final, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051125694, 4 Pages, Retrieved from the Internet: URL: http://www.3gpp.org/ftp/Meetings_3GPP_SYNC/RAN1/Docs/. [retrieved on Aug. 21, 2016] section 2.1.

* cited by examiner

TECHNIQUES FOR GENERATING SIGNAL SEQUENCES FOR WIRELESS COMMUNICATIONS

CLAIM OF PRIORITY UNDER 35 U.S.C. § 119

The present Application for Patent is a continuation of patent application Ser. No. 16/709,621, entitled "TECHNIQUES FOR GENERATING SIGNAL SEQUENCES FOR WIRELESS COMMUNICATIONS" filed Dec. 10, 2019, now U.S. Pat. No. 11,329,851, which is assigned to the assignee hereof and hereby expressly incorporated by reference herein for all purposes.

BACKGROUND

Aspects of the present disclosure relate generally to wireless communication systems, and more particularly, to generating sequence for transmitting and/or receiving certain signals in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine-type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, Zadoff-Chu sequences are used as a low peak average power ratio (PAPR) sequence for generating uplink reference signals transmissions, such as sounding reference signal (SRS) or demodulation reference signal (DMRS), transmitted from a user equipment (UE) to a base station, where the Zadoff-Chu sequences are generated to be of a desired length.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, an apparatus for wireless communication is provided that includes a transceiver, a memory configured to store instructions, and one or more processors communicatively coupled with the transceiver and the memory. The one or more processors are configured to generate, based on a sequence length for communicating a signal, a reduced length sequence to be of a reduced length that is a largest prime number smaller than a fraction of the sequence length, extend the reduced length sequence to be of the sequence length to generate a sequence for communicating the signal, and transmit or receive the signal based on the sequence.

In a further example, a method of wireless communication is provided. The method includes generating, based on a sequence length for communicating a signal, a reduced length sequence to be of a reduced length that is a largest prime number smaller than a fraction of the sequence length, extending the reduced length sequence to be of the sequence length to generate a sequence for communicating the signal, and transmitting or receiving the signal based on the sequence.

In another example, an apparatus for wireless communication is provided that includes means for generating, based on a sequence length for communicating a signal, a reduced length sequence to be of a reduced length that is a largest prime number smaller than a fraction of the sequence length, means for extending the reduced length sequence to be of the sequence length to generate a sequence for communicating the signal, and means for transmitting or receiving the signal based on the sequence.

In another example, a computer-readable medium including code executable by one or more processors for wireless communication is provided. The code includes code for generating, based on a sequence length for communicating a signal, a reduced length sequence to be of a reduced length that is a largest prime number smaller than a fraction of the sequence length, extending the reduced length sequence to be of the sequence length to generate a sequence for communicating the signal, and transmitting or receiving the signal based on the sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
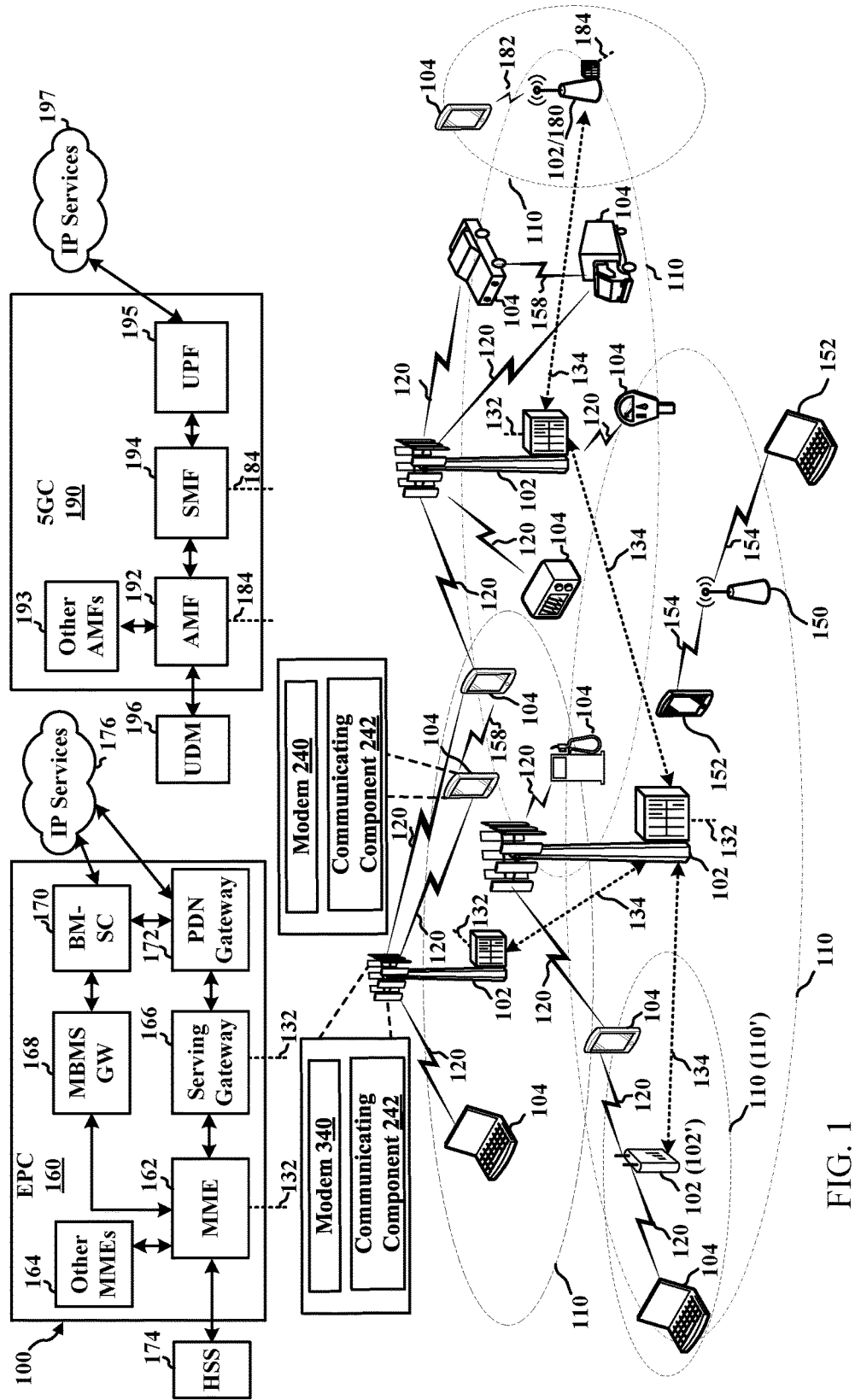
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to generating Zadoff-Chu (ZC) sequences with desirable peak average power ratio (PAPR) properties for communicating signals in wireless communications. For example, for certain signals, a node can generate a ZC sequence to represent the signals, and can transmit the signals based on the generated ZC sequence. In addition, for example, another node can receive the signals based on the generated ZC sequence. In wireless communication technologies such as fifth generation (5G) new radio (NR), a user equipment (UE) generates the ZC sequence for an uplink reference signal, such as sounding reference signal (SRS), uplink demodulation reference signal (DMRS), a random access preamble (e.g., transmitted as part of a random access channel (RACH) procedure to establish connection with a base station), etc., to be of a length that is a prime number. For sequences having a specified length that is not a prime number, the UE generates a ZC sequence of a reduced length of a largest prime number that is smaller than the desired length, and then cyclically extends the reduced length ZC sequence to be of the specified length.

For example, in 5G NR (as described in third generation partnership project (3GPP) technical specification (TS) 38.211, version 15.7.0, section 5.2.2.1, for base sequences of length 36 or larger, a UE can generate a ZC sequence using a formula similar to the following:

For $M_{ZC} \geq 3N_{sc}^{RB}$, the base sequence $\bar{r}_{u,v}(0), \ldots, \bar{r}_{u,v}(M_{ZC} - 1)$ is given by $\bar{r}_{u,v}(n) = x_q(n \mod N_{ZC})$ where $x_q(m) = e^{-j\frac{\pi q m(m+1)}{N_{zc}}}$ $q = \lfloor \bar{q} + 1/2 \rfloor + v \cdot (-1)^{\lfloor 2\bar{q} \rfloor}$ $\bar{q} = N'_{ZC} \cdot (u + 1)/31$ The length $N_{ZC}$ is given by the largest prime number such that $N_{ZC} < M_{ZC}$, where $M_{ZC}$ is the specified length for the base sequence. Base sequences $\bar{r}_{u,v}(n)$ are divided into groups, where $u \in \{0, 1, \ldots, 29\}$ is the group number and v is the base sequence number within the group. For example, $r=[x\_q\ (0),\ x\_q\ (1),\ \ldots,\ x\_q\ (N_{ZC}-1), x\_q\ (0),\ \ldots,\ x\_q\ (M_{ZC}-N_{ZC}-1)]$ can be generated from a ZC sequence $x\_q$, where q denotes the root of the ZC sequence, and is roughly uniformly distributed between 1 and $N_{ZC}$. Moreover, for example, for each length≥60, 5G NR specifies generating 60 distinct ZC sequences with different root q.

Aspects described herein relate to generating ZC sequences that may have improved PAPR properties over currently generated ZC sequences. For example, given a specified length for generating a sequence, a node can determine a reduced length for a ZC sequence as a largest prime number that is less than (or equal to, in one example) than a fraction of the specified length. In one example, the fraction can be two-thirds of the specified length. In another example, the fraction can be selected based on the specified length for the sequence (e.g., a first fraction where the length achieves a first threshold, a second fraction where the length achieves a second threshold, etc.). In any case, the generated ZC sequence of the reduced length can then be extended, which can be represented as: $r=[x_q(0), x_q(1), \ldots, x_q(N'-1), x_q(0), \ldots, x_q(M-N'-1)]$, where N' is the reduced length of the ZC sequence and M is the specified length for the sequence, as described further herein. In addition, for example, a frequency domain single-carrier spread (FDSS) filter can be applied to the generated sequence to further reduce PAPR.

In the above examples, generating a ZC sequence based on the reduced length from the specified length of the desired sequence, and then extending the ZC sequence to the specified length, can provide improved PAPR properties over currently generated ZC sequences. Such sequences may be desirable for transmitting signals benefitting from low PAPR, which may include downlink signals, such as for greater than 52.6 gigahertz (GHz) transmissions, for downlink positioning reference signals (where coverage should be larger than other reference signals to allow nodes at cell edge to perform positioning based on the corresponding base station), etc. In addition, these concepts may be similarly applied for communicating the uplink reference signals described above, downlink reference signals (e.g., channel state information reference signals (CSI-RSs), downlink DMRSs, random access preamble, etc. For example, in 5G, downlink reference signals use pi/2 binary phase shift keying (BPSK) sequences, but the sequences described herein may be more suitable.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for generating sequences for communicating certain signals in wireless communications. Though a UE 104 and a base station 102 are shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine-type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can generate sequences used for communicating certain wireless signals. For example, communicating component 242 can determine a sequence length, and can generate one or more ZC sequences based on the sequence length. In an example, communicating component 242 can determine a reduced length for the one or more ZC sequences that is a largest prime number that is less than (or equal to) a fraction of the sequence length, and can extend the one or more ZC sequences to the sequence length to determine a sequence for generating or detecting the signal. In one example, the fraction can be two-thirds. In addition, for example, use of the fraction, and/or the value of the fraction itself, may depend on the sequence length, as described further herein. Using ZC sequences based on the reduced length may provide signals with improved PAPR. Communicating component 242 can use the generated sequence to transmit a signal to another node and/or to detect a signal received from another node.

Figure 2:
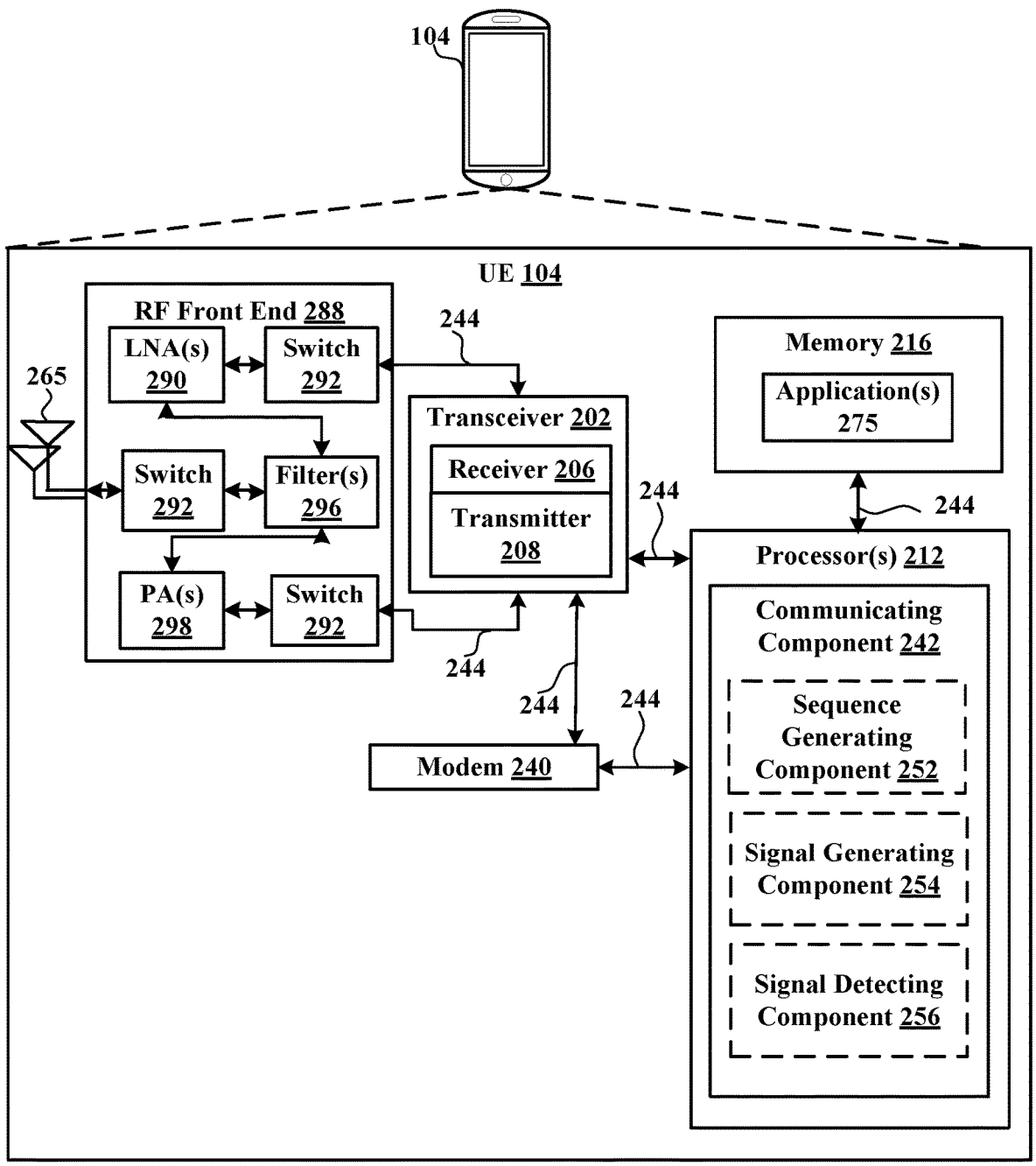
FIG. 2 is a block diagram illustrating an example of a UE, in accordance with various aspects of the present disclosure.
Figure 3:
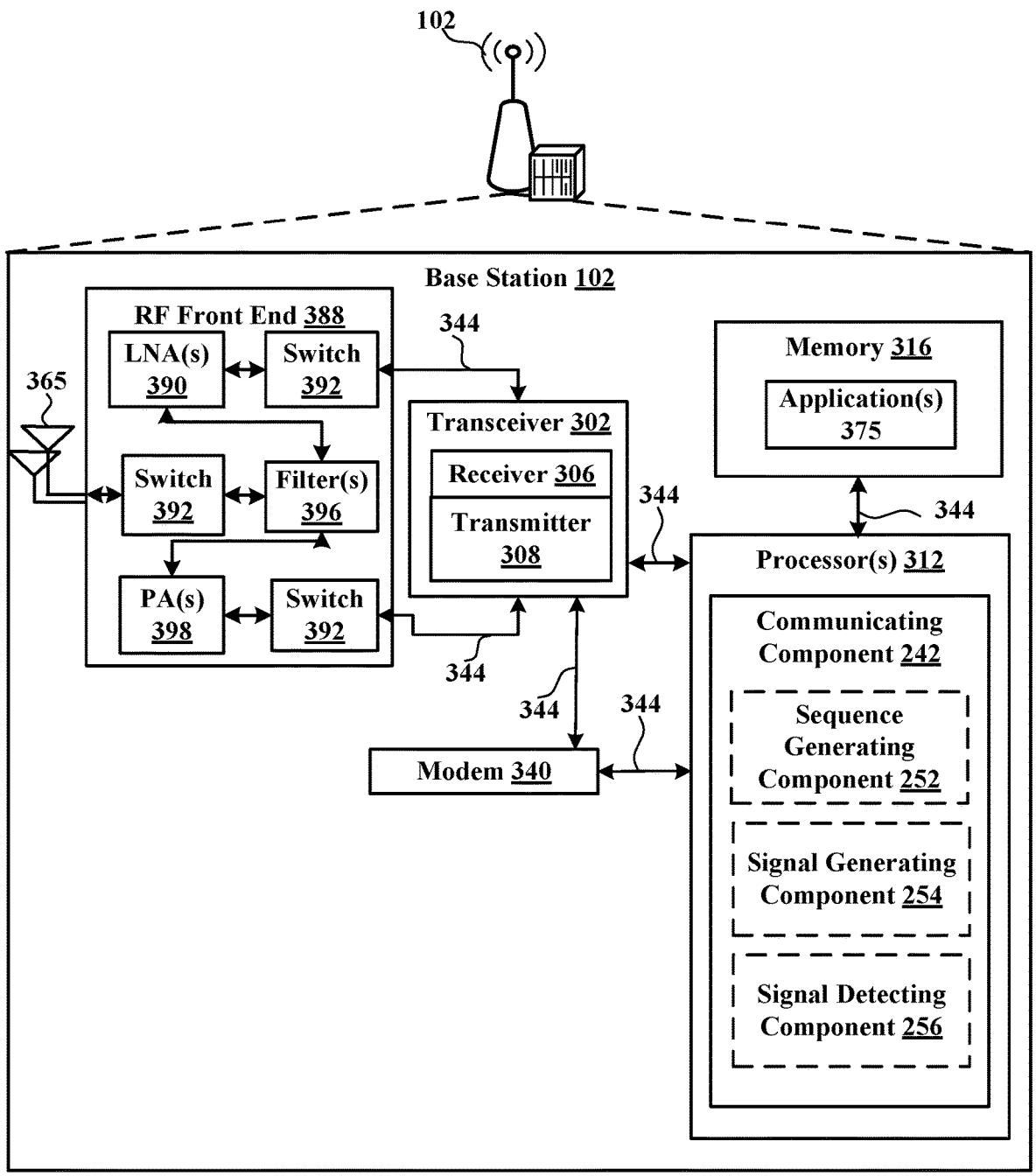
FIG. 3 is a block diagram illustrating an example of a base station, in accordance with various aspects of the present disclosure.
Figure 4:
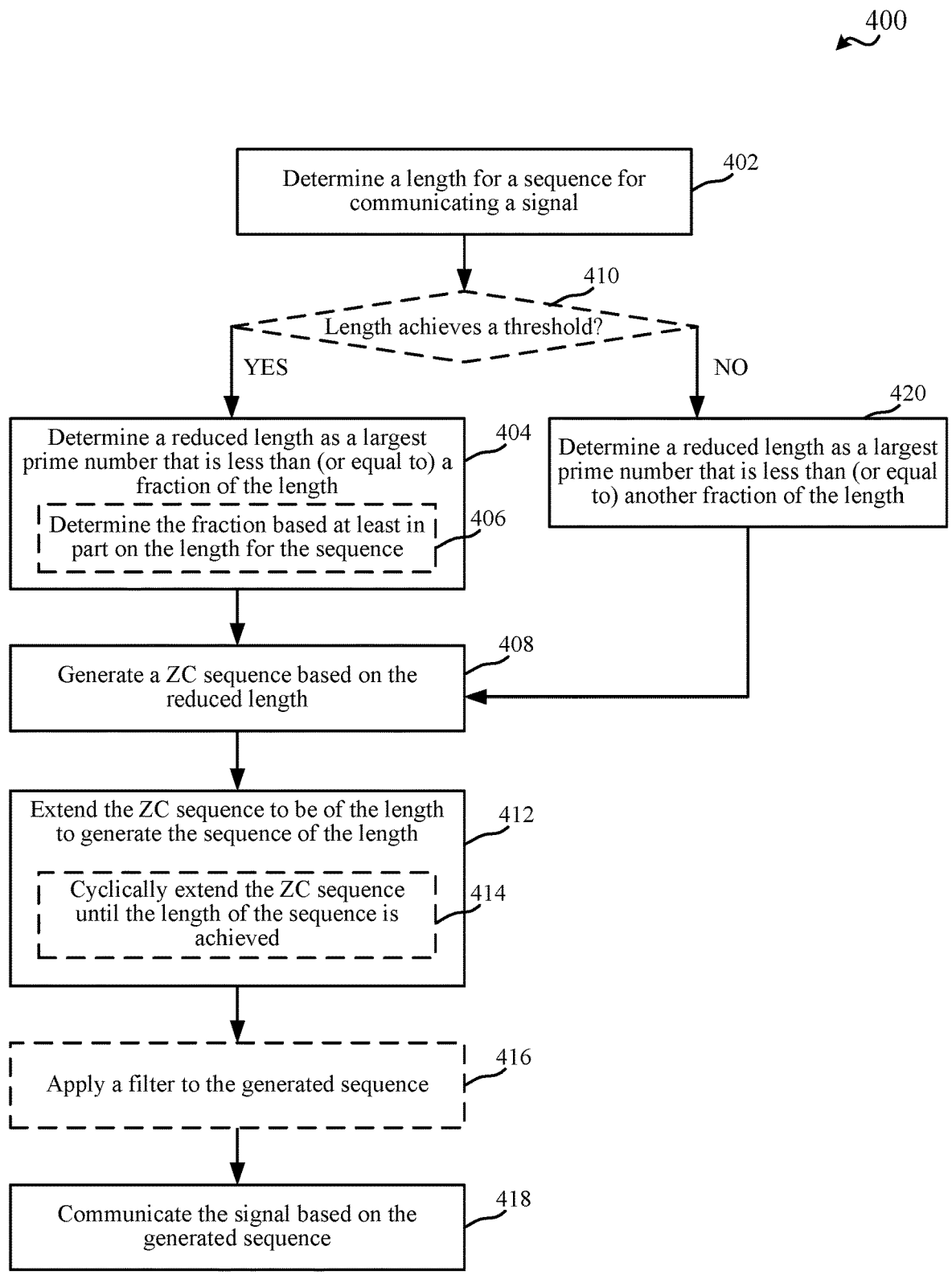
FIG. 4 is a flow chart illustrating an example of a method for generating sequences for communicating signals, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIG. 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for generating sequences for communicating certain signals in wireless communications, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a sequence generating component 252 for generating a sequence for a signal that is based on the reduced length ZC sequence, a signal generating component 254 for generating a signal for transmission based on the reduced length ZC sequence, and/or a signal detecting component 256 for detecting a received signal based on the reduced length ZC sequence, as described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and a communicating component 242 for generating sequences for communicating certain signals in wireless communications, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, communicating component 242 can optionally include a sequence generating component 252 for generating a sequence for a signal that is based on the reduced length ZC sequence, a signal generating component 254 for generating a signal for transmission based on the reduced length ZC sequence, and/or a signal detecting component 256 for detecting a received signal based on the reduced length ZC sequence, as described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for generating sequences for communicating signals among nodes in wireless communications. In an example, a UE (e.g., UE 104) can perform the functions described in method 400 using one or more of the components described in FIGS. 1 and 2, and/or a base station (e.g., base station 102) can perform the functions described in method 400 using one or more of the components described in FIGS. 1 and 3.

In method 400, at Block 402, a length for a sequence for communicating a signal can be determined. In an aspect, sequence generating component 252, e.g., in conjunction with processor(s) 212/312, memory 216/316, transceiver 202/302, communicating component 242, etc., can determine the length for the sequence for communicating the signal. For example, sequence generating component 252 can determine the length for the sequence for communicating the signal. For example, sequence generating component 252 can receive a base sequence length to be used for communicating a signal, such as a reference signal. For example, the reference signal may include, for a UE 104, an uplink reference signal (e.g., SRS, uplink DMRS, random access preamble, etc.), or for a base station 102, a downlink reference signal (e.g., downlink positioning reference signal, downlink CSI-RS, downlink DMRS, etc.), or other downlink signals in a frequency spectrum that achieves a threshold (e.g., larger than 56.2 GHz). For example, the base sequence length may be at least one of determined for a type of signal to be transmitted, determined based on one or more properties of communications with another node (e.g., signal power or quality of communications with the other node), determined based on a request or indication from the node transmitting the signal or another node receiving the signal, or another node altogether (e.g., in a configuration, such as a radio resource control (RRC) configuration, etc.

In a specific example, sequence generating component 252 can determine the base sequence length for a CSI-RS, positioning reference signal, SRS, or random access channel (RACH) preamble based on determining the length from an RRC configuration or a dynamic indication from a base station (e.g., downlink control information (DCI) or other indication in a physical downlink control channel (PDCCH) or other channel, etc.). In another specific example, sequence generating component 252 can determine the base sequence length for a DMRS (e.g., whether a downlink DMRS determined for or by a base station 102 or an uplink DMRS determined for or by a UE 104) based on the frequency-domain resource allocation (or more specifically, the number of resource blocks (RBs) allocated) of the corresponding data transmission.

In method 400, at Block 404, a reduced length can be determined as a largest prime number that is less than (or equal to, in one example) a fraction of the length. In an aspect, sequence generating component 252, e.g., in conjunction with processor(s) 212/312, memory 216/316, transceiver 202/302, communicating component 242, etc., can determine the reduced length as the largest prime number that is less than (or equal to, in one example) the fraction of the length. In one example, sequence generating component 252 can determine the reduced length as the largest prime number that is less than (or equal to, in one example) two-thirds of the length determined for the sequence.

Other fractions are possible as well, however, and in one example, in determining the reduced length at Block 404, optionally at Block 406, the fraction can be determined based at least in part on the length for the sequence. In an aspect, sequence generating component 252, e.g., in conjunction with processor(s) 212/312, memory 216/316, transceiver 202/302, communicating component 242, etc., can determine the fraction based at least in part on the length for the sequence. For example, sequence generating component 252 can determine the fraction as a first fraction (e.g., two-thirds (2/3)) for base sequence length that achieves a first threshold, or determine the fraction as a second fraction (e.g., three-fourths (3/4), 1, etc.) for base sequence length that does not achieve the first threshold. In another example, sequence generating component 252 can determine the fraction as a third fraction (e.g., some fraction less than 2/3) for base sequence length that achieves a second threshold (e.g., where the second threshold is greater than the first threshold), etc. In one example, the first threshold can be 48 (e.g., the sequence generating component 252 uses the first fraction of 2/3 if the length of the final sequence is greater than or equal to 48). In another example, sequence generating component 252 can determine the fraction as a first fraction (e.g., some fraction less than 2/3) for base sequence length greater than a first threshold, determine the fraction as a second fraction (e.g., 2/3) for base sequence length greater than a second threshold (e.g., where the second threshold is greater than the first threshold), etc. In other examples, sequence generating component 252 can determine the fractions that are different than 2/3, etc.

In method 400, at Block 408, a ZC sequence can be generated based on the reduced length. In an aspect, sequence generating component 252, e.g., in conjunction with processor(s) 212/312, memory 216/316, transceiver 202/302, communicating component 242, etc., can generate the ZC sequence based on the reduced length. For example, sequence generating component 252 can generate the ZC sequence using one or more formulas, where the selected formula may be based on the sequence length. In one example, for base sequence length $M_{ZC}$ that achieves a threshold:

The base sequence $\bar{r}_{u,v}(0), \ldots, \bar{r}_{u,v}(M_{ZC}-1)$ can be given by $$\bar{r}_{u,v}(n) = x_q(n \bmod N'_{ZC})$$

where $$x_q(m) = e^{-j\frac{\pi q m(m+1)}{N'_{ZC}}}$$

$$q = \lfloor \bar{q} + 1/2 \rfloor + v \cdot (-1)^{\lfloor 2\bar{q} \rfloor}$$

$$\bar{q} = N'_{ZC} \cdot (u+1)/31$$

The length $N'_{ZC}$ is given by the largest prime number that is the fraction (e.g., 2/3) of base sequence length $M_{ZC}$. Other formulas can be used as well, based on the fraction of the base sequence length, as described above.

In one example, for determining whether to generate the reduced length ZC sequence (e.g., at Block 408) and/or whether to determine the reduced length in the first place (e.g., at Block 404), optionally at Block 410, it can be determined whether the length (the length of the sequence determined at Block 402) achieves a threshold. In an aspect, sequence generating component 252, e.g., in conjunction with processor(s) 212/312, memory 216/316, transceiver 202/302, communicating component 242, etc., can determine whether the length achieves a threshold. For example, sequence generating component 252 may not use the reduced length based on the fraction for sequences that are less than a certain threshold (e.g., base sequence length less than 36), in which case, for example, sequence generating component 252 can generate the ZC sequence based on the largest prime number (e.g., $N_{ZC}$) that is less than the base sequence length (e.g., $M_{ZC}$), as described above. In this example, where sequence generating component 252 determines that the length does achieve the threshold (e.g., greater than or equal to 48). However, sequence generating component 252 can generate the ZC sequence based on the largest prime number (e.g., $N'_{ZC}$) that is less than the fraction of the base sequence length (e.g., 2/3*$M_{ZC}$), as described above.

In method 400, at Block 412, the ZC sequence can be extended to be of the length to generate the sequence of the length. In an aspect, sequence generating component 252, e.g., in conjunction with processor(s) 212/312, memory 216/316, transceiver 202/302, communicating component 242, etc., can extend the ZC sequence, which is of the reduced length, to be of the length (e.g., the length of the sequence determined at Block 402) such to generate the sequence of the length. Sequence generating component 252 can apply substantially any function to the ZC sequence to extend the length.

In one example, in extending the ZC sequence at Block 412, optionally at Block 414, the ZC sequence can be cyclically extended until the length of the sequence is achieved. In an aspect, sequence generating component 252, e.g., in conjunction with processor(s) 212/312, memory 216/316, transceiver 202/302, communicating component 242, etc., can cyclically extend the ZC sequence, which may be of length $N'_{ZC}$, until the sequence length of $M_{ZC}$ is achieved to generate the sequence that can be used for communicating certain signals, as described herein. In an example, cyclically extending the sequence can include appending a repetition of at least a portion of the ZC sequence on the end of the ZC sequence, where the repetition is of a size that allows for achieving the length of the sequence. For example, sequence generating component 252 can extend (e.g., cyclically extend) the length–$N'_{ZC}$ sequence to length $M_{ZC}$, which can be represented as $r=[x_q(0), x_q(1), \ldots, x_q(N'_{ZC}-1), x_q(0), \ldots, x_q(M_{ZC}-N'_{ZC}-1)]$.

In one example, two-thirds can be a desirable fraction to use in generating the ZC sequence because using two-thirds of the base sequence length to generate a ZC sequence with extension can create a structure of at least [A, B, A] in the frequency domain, where A and B represent subsequences of the sequence, and the length of A and B subsequences can each be of 1/3*$M_{ZC}$, respectively. When a inverse-Fourier transform is applied, for example, this structure can also create a particular phase ramp in the time domain. This phase ramp and/or structure of ZC sequence in time domain can imply an observed low PAPR property. In addition, at least from a transmitting side, a time domain (TD) filter can be applied to further reduce PAPR property of the signal, as described further herein.

In method 400, optionally at Block 416, a filter can be applied to the generated sequence. In an aspect, sequence generating component 252, e.g., in conjunction with processor(s) 212/312, memory 216/316, transceiver 202/302, communicating component 242, etc., can apply the filter to the generated sequence, at least where communicating component 242 is transmitting the signal based on the sequence. For example, the filter may include a frequency domain (FD) or time domain (TD) filter. For example, the filter may include a FD single-carrier spread (FDSS) filter to the generated sequence. In one example, the FDSS filter may correspond to a time domain filter with up to three significant taps (e.g., [0.28, 1, 0.28]). For example, sequence generating component 252 can multiply the sequence by the first tap (e.g., 0.28), shift the sequence by one and multiple the shifted sequence by the second tap (e.g., 1), and then shift the sequence by two and multiply the shifted sequence by the third tap (e.g., 0.28). This can create a filtered sequence as a circular convolution between the filter taps (coefficients) and the sequence. This may further reduce PAPR by ~1-1.5 decibels in some cases.

In method 400, at Block 418, the signal can be communicated based on the generated sequence. In an aspect, signal generating component 254, e.g., in conjunction with processor(s) 212/312, memory 216/316, transceiver 202/302, communicating component 242, etc., can communicate the signal based on the generated sequence by generating and/or transmitting the signal based on the generated sequence. For example, signal generating component 254 can generate the signal as the sequence, and communicating component 242 can transmit the signal as the sequence. As described, for a base station 102, signal generating component 254 can generate certain signals, such as reference signals, downlink positioning signals, CSI-RS, downlink DMRS, signals for communication over 56.2 GHz, etc., for transmission based on the above-described sequences. For a UE 104, in an example, signal generating component 242 can generate certain signals, such as uplink reference signals, SRS, uplink DMRS, random access preamble, etc., for transmission based on the above-described sequences.

In an aspect, signal detecting component 256, e.g., in conjunction with processor(s) 212/312, memory 216/316, transceiver 202/302, communicating component 242, etc., can communicate the signal based on the generated sequence by detecting the signal based on the generated sequence. For example, communicating component 242 can receive signals as a sequence that was generated as described above, and signal detecting component 256 can detect the sequence in the signal to determine a type of the signal and/or other information corresponding to the signal. For a UE 104, for example, communicating component 242 can receive, from a base station 102, certain signals that were generated based on the sequence, such as reference signals, downlink positioning signals, CSI-RS, downlink DMRS, signals for communication over 56.2 GHz, etc., and signal detecting component 256 can detect and identify such signals based on detecting that a sequence related to the signals corresponds to a sequence generated as described above. For a base station 102, in an example, communicating component 242 can receive, from a UE 104, certain signals that were generated based on the sequence, such as such as uplink reference signals, SRS, uplink DMRS, etc., and signal detecting component 256 can detect and identify such signals based on detecting that a sequence related to the signals corresponds to a sequence generated as described above.

Figure 5:
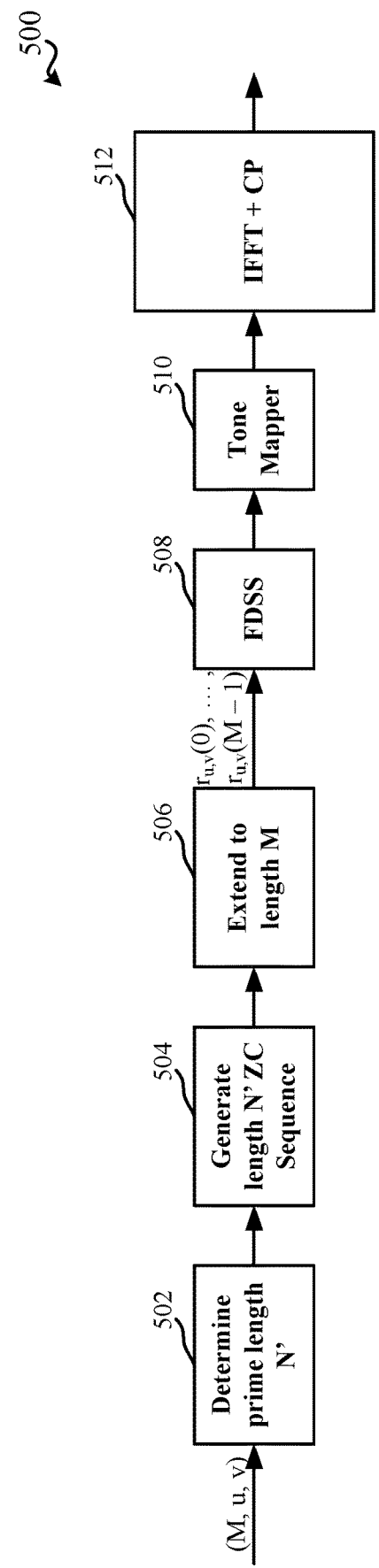
FIG. 5 is a flow chart illustrating an example of a process and/or functions for generating sequences for communicating signals, in accordance with various aspects of the present disclosure.

FIG. 5 illustrates an example of a process 500 or related RF components, which may be used by a UE 104 or base station 102, to generate sequences for transmitting certain signals, as described herein. Process 500 can include, at Block 502, determining a prime length $N'_{ZC}$ for a base sequence defined by length $M_{ZC}$, and variables u, v, as described in formulas above. Determining the prime length $N'_{ZC}$ can include determining the largest prime number $N'_{ZC}$ that is less than (or equal to, in one example) $M_{ZC}$, as described above. At Block 504, a length $N'_{ZC}$ sequence can be generated, and at Block 506, the length $N'_{ZC}$ sequence can be extended to length $M_{ZC}$, e.g., by cyclically extending (e.g., repeating) the $N'_{ZC}$ sequence until the sequence is of length $M_{ZC}$, to generate sequence $r_{u,v}=[(0), \ldots, r_{u,v}(M_{ZC}-1)]$. At Block 508, the FDSS filter, or an equivalent filter in the time domain (as described above) can be applied to the generated sequence. At Block 510, a tone mapper can map the generated sequence to frequency tones for transmission. At Block 512, an inverse fast Fourier transform (IFFT) and cyclic prefix (CP) can be applied to the mapped tones to spread the mapped tones over one or more OFDM symbols for wireless transmission to one or more other nodes, as described herein.

Figure 6:
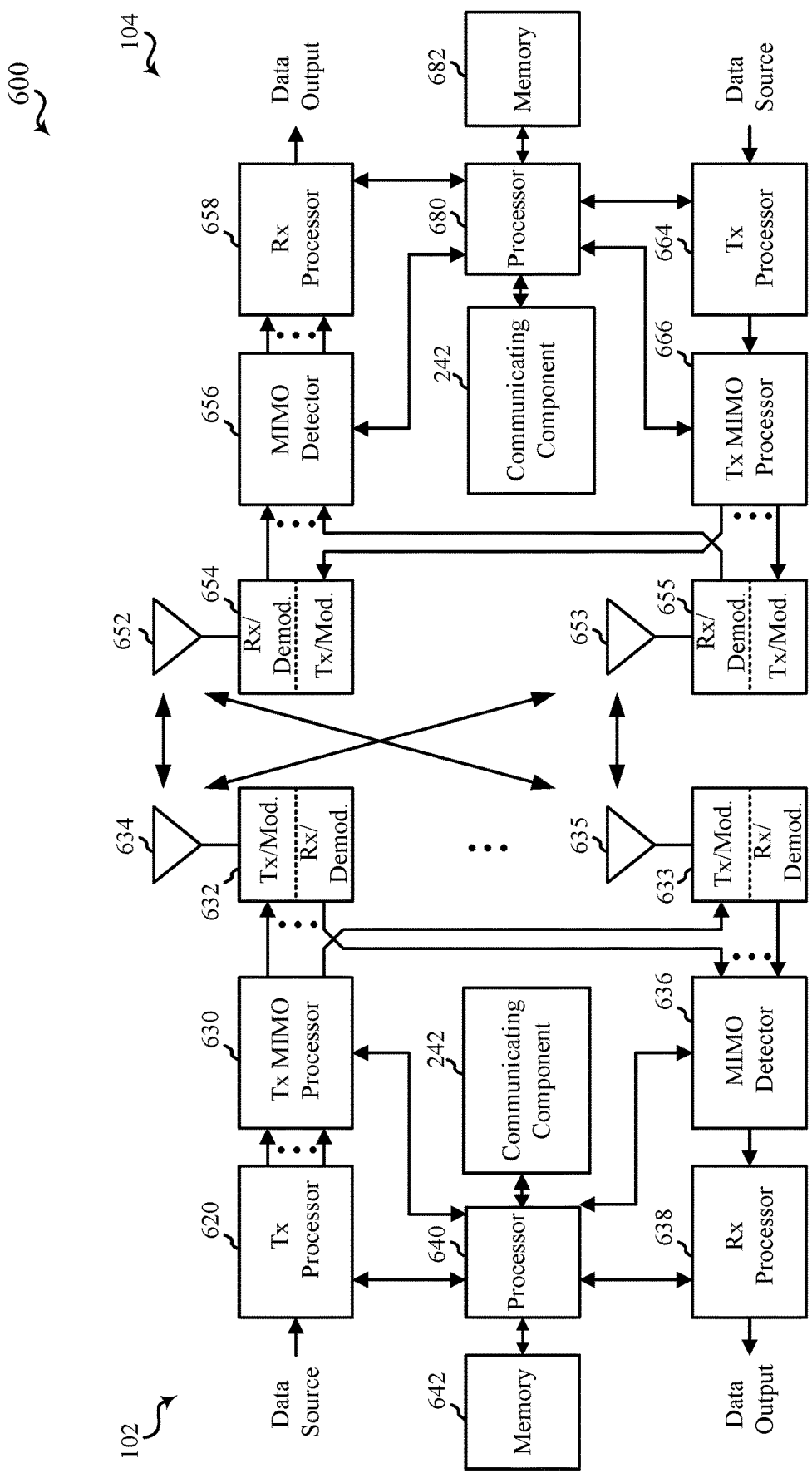
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104, in accordance with various aspects of the present disclosure. The MIMO communication system 600 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a communicating component 242 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the transceiver and the memory, wherein the one or more processors are configured to:
      generate, based on a sequence length for communicating a signal, a reduced length sequence to be of a reduced length that is a largest prime number smaller than a fraction of the sequence length;
      extend the reduced length sequence to be of the sequence length to generate a sequence for communicating the signal; and
      transmit or receive, via the transceiver, the signal based on the generated sequence.

2. The apparatus of claim 1, wherein the one or more processors are configured to generate the reduced length sequence based at least in part on the sequence length achieving a threshold.

3. The apparatus of claim 1, wherein the fraction is one of a first fraction where the sequence length achieves a first threshold, or a second fraction where the sequence length achieves a second threshold.

4. The apparatus of claim 1, wherein the fraction of the sequence length is two-thirds of the sequence length.

5. The apparatus of claim 1, wherein the one or more processors are configured to extend the reduced length sequence at least in part by cyclically extending the reduced length sequence until the sequence length is achieved.

6. The apparatus of claim 1, wherein the one or more processors are configured to transmit the signal based on the generated sequence.

7. The apparatus of claim 6, wherein the one or more processors are configured to apply, before transmitting the signal, a frequency domain single-carrier spread (FDSS) filter to the generated sequence.

8. The apparatus of claim 7, wherein the FDSS filter relates to a time domain filter with up to three significant taps.

9. The apparatus of claim 6, wherein the apparatus is a base station and wherein the one or more processors are configured to transmit a downlink positioning reference signal, a downlink demodulation reference signal (DMRS), or a downlink channel state information reference signal (CSI-RS).

10. The apparatus of claim 6, wherein the apparatus is a user equipment (UE), and wherein the one or more processors are configured to transmit a sounding reference signal (SRS), an uplink demodulation reference signal (DMRS), or a random access preamble.

11. The apparatus of claim 1, wherein the one or more processors are configured to receive the signal based on the generated sequence, and wherein the one or more processors are further configured to detect the received signal based on the generated sequence.

12. The apparatus of claim 11, wherein the apparatus is a base station and wherein the one or more processors are configured to receive a downlink positioning reference signal, a downlink demodulation reference signal (DMRS), or a downlink channel state information reference signal (CSI-RS).

13. The apparatus of claim 11, wherein the apparatus is a user equipment (UE), and wherein the one or more processors are configured to receive a sounding reference signal (SRS) or an uplink demodulation reference signal (DMRS).

14. A method of wireless communication, comprising:
   generating, based on a sequence length for communicating a signal, a reduced length sequence to be of a reduced length that is a largest prime number smaller than a fraction of the sequence length;
   extending the reduced length sequence to be of the sequence length to generate a sequence for communicating the signal; and
   transmitting or receiving the signal based on the generated sequence.

15. The method of claim 14, wherein generating the reduced length sequence is based at least in part on the sequence length achieving a threshold.

16. The method of claim 14, wherein the fraction is one of a first fraction where the sequence length achieves a first threshold, or a second fraction where the sequence length achieves a second threshold.

17. The method of claim 14, wherein the fraction of the sequence length is two-thirds of the sequence length.

18. The method of claim 14, wherein extending the reduced length sequence comprises cyclically extending the reduced length sequence until the sequence length is achieved.

19. The method of claim 14, wherein transmitting or receiving the signal comprises transmitting the signal based on the generated sequence.

20. The method of claim 19, further comprising applying, before transmitting the signal, a frequency domain single-carrier spread (FDSS) filter to the generated sequence.

21. The method of claim 20, wherein the FDSS filter relates to a time domain filter with up to three significant taps.

22. The method of claim 19, wherein transmitting the signal comprises transmitting, by a base station, a downlink positioning reference signal, a downlink demodulation reference signal (DMRS), or a downlink channel state information reference signal (CSI-RS).

23. The method of claim 19, wherein transmitting the signal comprises transmitting, by a user equipment (UE), a sounding reference signal (SRS), an uplink demodulation reference signal (DMRS), or a random access preamble.

24. The method of claim 14, wherein transmitting or receiving the signal comprises receiving the signal based on the generated sequence, and further comprising detecting the received signal based on the generated sequence.

25. The method of claim 24, wherein receiving the signal comprises receiving, from a base station, a downlink positioning reference signal, a downlink demodulation reference signal (DMRS), or a downlink channel state information reference signal (CSI-RS).

26. The method of claim 24, wherein receiving the signal comprises receiving, from a user equipment (UE), a sounding reference signal (SRS) or an uplink demodulation reference signal (DMRS).

27. An apparatus for wireless communication, comprising:
- means for generating, based on a sequence length for communicating a signal, a reduced length sequence to be of a reduced length that is a largest prime number smaller than a fraction of the sequence length;
- means for extending the reduced length sequence to be of the sequence length to generate a sequence for communicating the signal; and
- means for transmitting or receiving the signal based on the generated sequence.

28. The apparatus of claim 27, wherein the means for generating generates the reduced length sequence based at least in part on the sequence length achieving a threshold.

29. A non-transitory computer-readable medium, comprising code executable by one or more processors for wireless communication, the code comprising code for:
- generating, based on a sequence length for communicating a signal, a reduced length sequence to be of a reduced length that is a largest prime number smaller than a fraction of the sequence length;
- extending the reduced length sequence to be of the sequence length to generate a sequence for communicating the signal; and
- transmitting or receiving the signal based on the generated sequence.

30. The non-transitory computer-readable medium of claim 29, wherein the code for generating generates the reduced length sequence based at least in part on the sequence length achieving a threshold.

* * * * *